United States Patent
Vallverdu Verge et al.

(10) Patent No.: US 11,472,111 B2
(45) Date of Patent: Oct. 18, 2022

(54) RESOURCE CONSUMPTION CONTROL

(71) Applicant: HEWLETT-PACKARD DEVELOPMENT COMPANY, L.P., Spring, TX (US)

(72) Inventors: Josep Vallverdu Verge, Sant Cugat del Valles (ES); Josep M. Asensio Buchaca, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,774

(22) PCT Filed: May 15, 2018

(86) PCT No.: PCT/US2018/032721
§ 371 (c)(1),
(2) Date: Oct. 16, 2019

(87) PCT Pub. No.: WO2019/221702
PCT Pub. Date: Nov. 21, 2019

(65) Prior Publication Data
US 2021/0331396 A1    Oct. 28, 2021

(51) Int. Cl.
| | |
|---|---|
| *G06F 19/00* | (2018.01) |
| *B29C 64/343* | (2017.01) |
| *B33Y 10/00* | (2015.01) |
| *B33Y 30/00* | (2015.01) |
| *B33Y 50/02* | (2015.01) |
| *B29C 64/393* | (2017.01) |

(52) U.S. Cl.
CPC .......... *B29C 64/343* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B29C 64/343; B29C 64/393; B33Y 50/02; B33Y 10/00; B33Y 30/00
See application file for complete search history.

(56) References Cited

U.S. PATENT DOCUMENTS

| | | |
|---|---|---|
| 6,301,449 B1 | 10/2001 | Miura |
| 7,686,995 B2 | 3/2010 | Davidson et al. |
| 7,828,022 B2 | 11/2010 | Davidson et al. |

(Continued)

FOREIGN PATENT DOCUMENTS

| | | |
|---|---|---|
| CN | 103737932 A | 4/2014 |
| CN | 104010750 A | 8/2014 |

(Continued)

*Primary Examiner* — Zhipeng Wang
(74) *Attorney, Agent, or Firm* — HP Inc. Patent Department

(57) ABSTRACT

Certain examples relate to a material management station for use in an additive manufacturing process. In these examples a metering system is applied to measure the amount of build material transported into the material management station from refillable containers. Data describing the metered amount of build material is communicated over a data communication network and remotely compared to an allowance of usage stored in an administration system. Control messages are communicated to the material management station preventing or allowing further use of the build material in line with the allowance usage.

15 Claims, 6 Drawing Sheets

(56) References Cited

U.S. PATENT DOCUMENTS

| | | | |
|---|---|---|---|
| 8,658,250 B2 | 2/2014 | Batchelder et al. | |
| 10,189,623 B2 | 1/2019 | Voelker | |
| 2007/0097161 A1 | 5/2007 | Ejiri et al. | |
| 2017/0046104 A1 | 2/2017 | Van Vonderen et al. | |
| 2017/0096315 A1* | 4/2017 | Jackson | H04L 63/102 |
| 2017/0190186 A1 | 7/2017 | Kubota et al. | |
| 2017/0326803 A1 | 11/2017 | Chanclon et al. | |
| 2019/0054703 A1* | 2/2019 | Hockley | B28B 17/0081 |
| 2019/0118467 A1* | 4/2019 | Neboian | B29C 64/118 |
| 2021/0205889 A1* | 7/2021 | Roure Pastor | B22F 10/70 |

FOREIGN PATENT DOCUMENTS

| | | | |
|---|---|---|---|
| CN | 105437549 A | 3/2016 | |
| CN | 105939836 A | 9/2016 | |
| CN | 106976235 A | 7/2017 | |
| CN | 206796568 U | 12/2017 | |
| CN | 107820460 A | 3/2018 | |
| CN | 107835737 A | 3/2018 | |
| CN | 108025501 | 5/2018 | |
| JP | 2017121801 | 7/2017 | |
| WO | 2004044816 | 5/2004 | |
| WO | WO2017030571 A1 | 2/2017 | |
| WO | WO-2017194107 A1 * | 11/2017 | B22F 3/004 |
| WO | 2018/080458 A1 | 5/2018 | |

\* cited by examiner

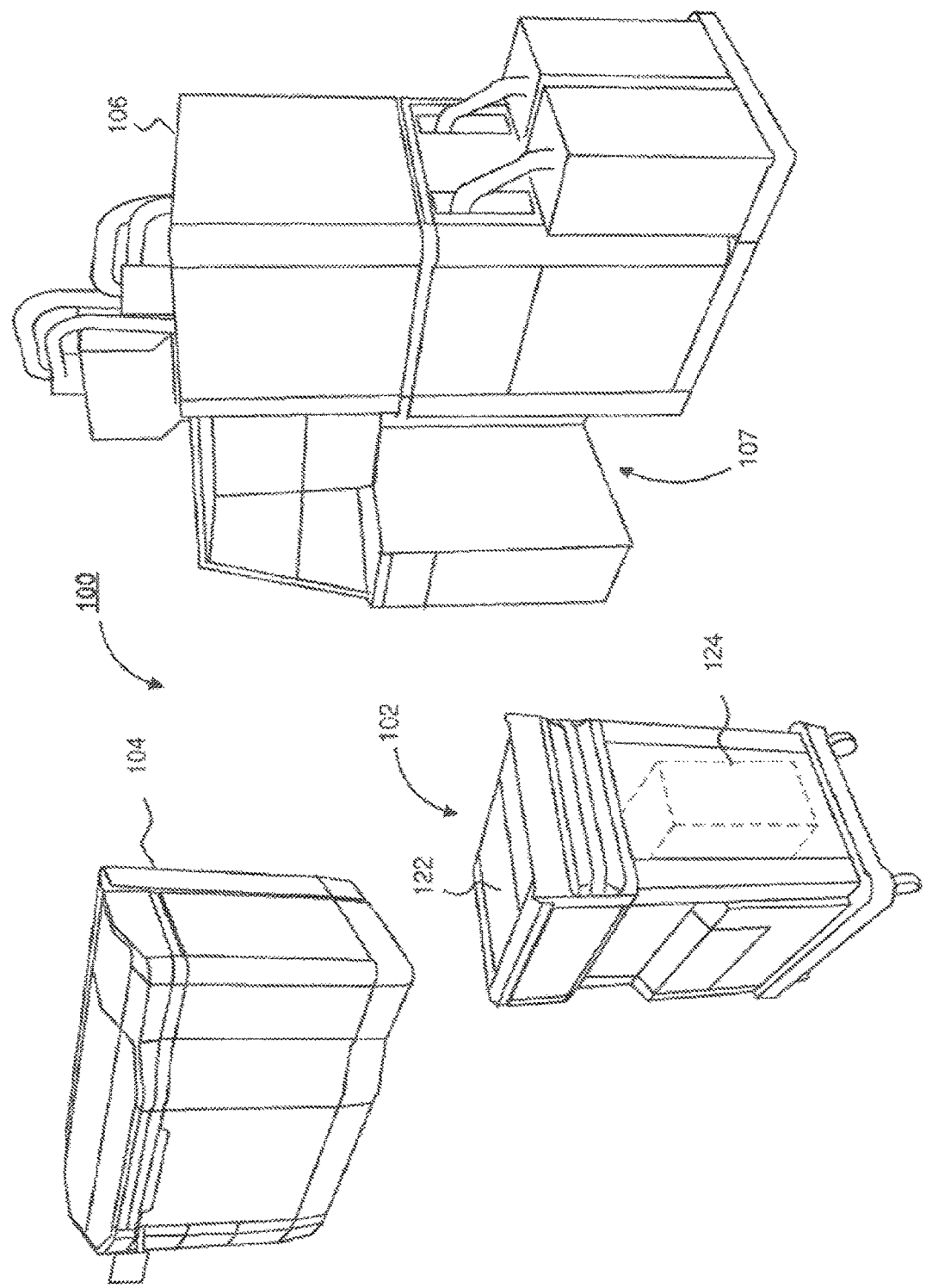

RESOURCE CONSUMPTION CONTROL

BACKGROUND

Some additive manufacturing systems build three-dimensional objects by depositing agents on portions of successive layers of build material and applying energy from at least one energy source to facilitate the solidification of the portions of build material on which agents have been deposited. Other systems may use other techniques to selectively solidify portions of successive layers of build material.

BRIEF DESCRIPTION OF THE DRAWINGS

Various features of the present disclosure will be apparent from the detailed description which follows, taken in conjunction with the accompanying drawings; which together illustrate features of the present disclosure, and wherein:

FIG. 1A schematically illustrates an example of an additive manufacturing system;

FIG. 6 schematically illustrates a non-transitory computer readable storage medium according to an example.

DETAILED DESCRIPTION

Figure 1B:
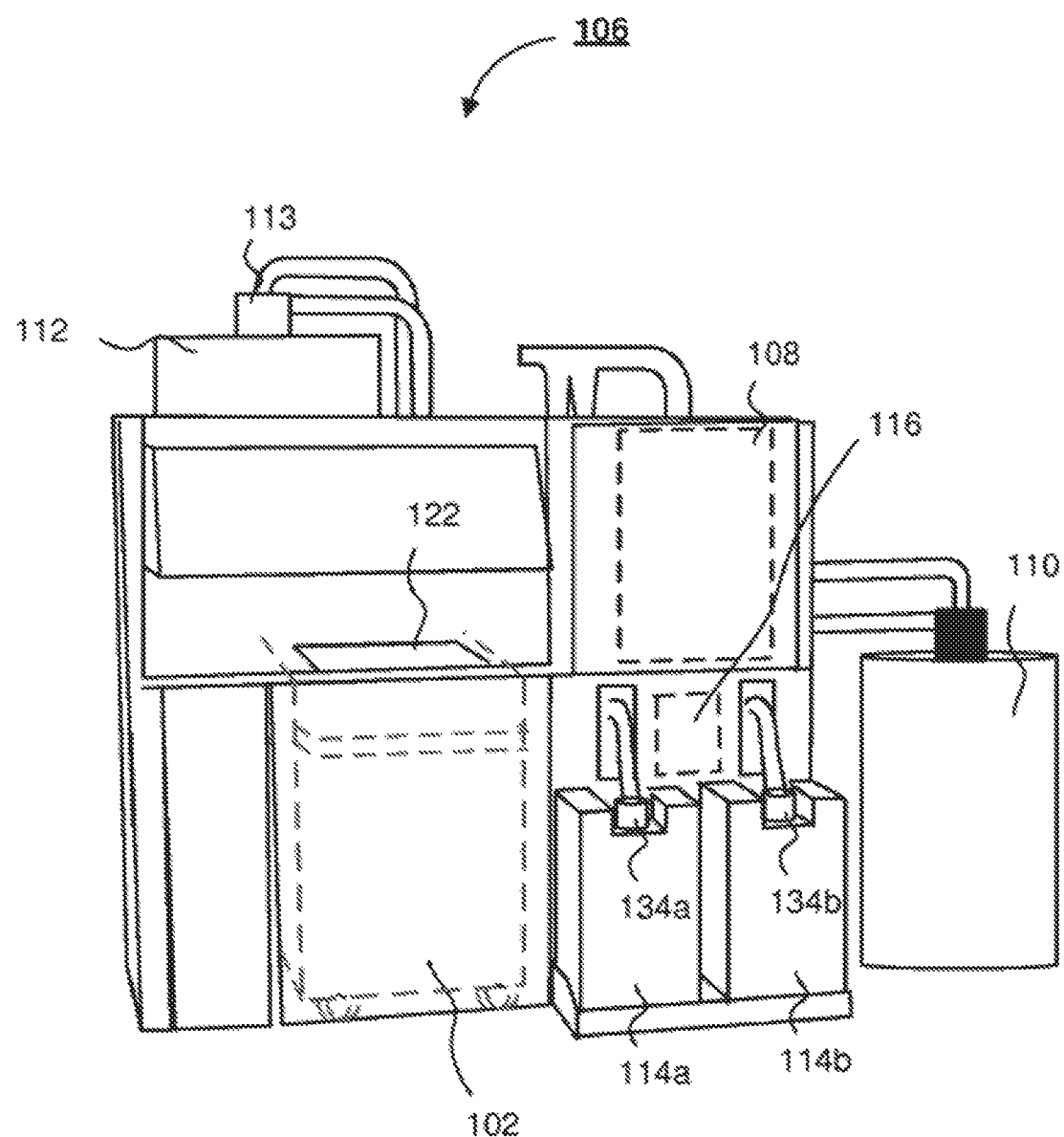
FIG. 1B schematically illustrates the material management station of FIG. 1A.

As shown in FIG. 1A, a three-dimensional (3D) printing system 100 (also referred to as an additive manufacturing system) according to one example comprises: a build unit, 102, a 3D printer 104 and a material management station 106. The material management station 106 may manage build material for one or more 3D printers and/or for one or more build units.

The build unit 102 is arranged to slot into a docking position in the printer 104 to allow the printer 104 to generate a 3D object within the build unit. The build unit is also arranged to also slot (at a different time) into a docking position 107 in the material management station 106. The build unit 102 may be docked in the material management station 106 prior to a 3D printing process to load the build unit with build material in preparation for a subsequent 3D printing process that will be performed by the 3D printer 104.

The build material loaded into the build unit may include recycled or otherwise recovered build material from one or more previous printing processes, fresh build material, or a mix of fresh and recovered build material. Some build materials may be non-recyclable and hence in this case no recovered build material will be used to load the build unit. The build material may be or include, for example, powdered metal materials, short fiber materials that may, for example, have been cut into short lengths from long strands or threads of material, powdered composited materials, powder ceramic materials, powdered glass materials, powdered resin material, powdered polymer materials and the like. In some examples where the build material is a powder-based build material, the term powder based materials is intended to encompass both dry and wet powder based materials, particulate materials and granular materials. In one example, the build material may be a powdered semi-crystalline thermoplastic material. It should be understood that the examples described herein are not limited to powder-based materials, and may be used, with suitable modification if appropriate, with other suitable build materials. In other examples, the build material may be in the form of pellets, or any other suitable form of build material, for instance.

Returning to FIG. 1A, the build unit 102 may also be docked in, or otherwise connected to, the docking position 107 in the material management station 106 (shown without the build unit 102 docked in FIG. 1A) to clean up at least some components of the build unit 102 after it has been used in a 3D printing production process. The clean-up process may involve recovery and storage in the material management station 106 of non-solidified build material from the previous print job for subsequent reuse. During a 3D printing process a portion of the supplied build material may be fused or otherwise bound to form the 3D object, whilst a remaining portion of the supplied build material may remain non-solidified or unbound and potentially recyclable, depending upon the type of build material used. Some processing of the non-solidified build material may be performed by the material management station 106 prior to storage for recycling, to reduce any agglomeration for example.

One material management station 106 can be used to service one or more different 3D printers, using one or more build units 102. A given 3D printer may interchangeably be connected with one or more build units 102, for example, utilizing different build units for different build materials. The material management station 106 can purge a build unit 102 of a given build material after a 3D printing production process, allowing it to be filled with a different build material for a subsequent printing production run. Purging of the build unit 102 may also involve purging of the material management station 106 or alternatively, it may involve separation of different build materials in the material management station 106 to limit contamination of one build material type with another.

The build unit 102 in this example has a build platform 122 on which an object being manufactured is constructed. The build unit 102 also comprises a build material store 124, which is situated beneath a build platform 122 in this example. The build platform 122 may be arranged to have an actuation mechanism (not shown) allowing it, when it is docked in the printer 104 and during a 3D printing production process, to gradually move down, such as in a step-wise manner, towards the base of the build unit 102 as the printing of the 3D object progresses and as the build material store 124 within the build unit 102 becomes depleted. This provides progressively more distance between the base level of the build platform 122 and the print carriages (not shown) to accommodate the 3D object being manufactured. The size of an object being printed may increase progressively as it is built up layer-by-layer in the 3D printing process in this example.

The 3D printer 104 of this example can generate a 3D object by using a build material depositor carriage (not shown) to form layers of build material onto the build platform 122. Certain regions of each deposited layer are solidified by the printer 104 to progressively form the object according to object-specifying data. The object-specifying data are based on a 3D shape of the object and may also provide object property data such as strength or roughness corresponding to the whole object or part(s) of the 3D object. In examples, the desired 3D object properties may also be supplied to the 3D printer 104 via a user interface, via a software driver or via predetermined object property data stored in a memory.

After a layer of the build material has been deposited on the build platform 122 by the printer 104, a page-wide array of printheads on a carriage (not shown) of the 3D printer 104 can traverse the build platform 122 to selectively deposit an agent in a pattern based on where particles of the build material are to be solidified together, Once the fusing agent has been applied, the layer of build material may be exposed to fusing energy using one or more heating or curing elements (not shown) of the 3D printer 104. The build material deposition, fusing agent and fusing energy application process may be repeated in successive layers until a complete 3D object has been generated. The material management station 106 may be used with any additive manufacturing technique and is not limited to printers using printheads on a carriage to deposit a printing agent as in the example described above. Chemical binder systems, such as BinderJet™, or metal type 3D printing may also be used. For example, the material management station 106 may be used with a selective laser sintering additive manufacturing technique.

According to one example, a suitable fusing agent may be an ink-type formulation comprising carbon black, such as, for example, the fusing agent formulation commercially known as V1Q60Q "HP fusing agent" available from HP Inc. In one example such a fusing agent may additionally comprise an infra-red light absorber. In one example such an ink may additionally comprise a near infra-red light absorber. In one example such a fusing agent may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from HP Inc. According to one example, a suitable detailing agent may be a formulation commercially known as V1Q61A "HP detailing agent" available from HP Inc. According to one example, a suitable build material may be PA12 build material commercially known as V1R10A "HP PA12" available from HP Inc.

FIG. 1B schematically illustrates the material management station 106 of the example of FIG. 1A, with the build unit 102 of FIG. 1A docked therein.

As shown in the example of FIG. 1B, the material management station 106 has two ports for receiving supply containers 114a, 114b, which may be releasably connectable to the material management station 106. In one example, supply containers 114a, 114b may be of a first type such as a type referred to herein as "single-use", these being pre-filled and non-user refillable supply containers (which may also referred to as cartridges) intended for a single dispensing of its contents, and/or a second type such as a type referred to herein as "bulk-refillable", these being refillable supply containers (which may also referred to as hoppers) that can be refilled from a larger bulk supply container, and dispense their contents many times over. A bulk-refillable supply container which may be refillable from a bulk supply of fresh build material, for example from a package of build material storing at least a multiple of times larger than the volume of the bulk-refillable supply container. The bulk-refillable supply container may include a refill port whereby fresh material can be introduced from one or more larger bulk supply containers or time and thus refilled.

The provision of two supply containers ports allows "hot swapping" to be performed such that if a currently active container becomes empty or close to empty of build material when the build unit 102 is being filled with build material by the material management station 106 in preparation for an additive manufacturing process, a fresh build material supply source can be dynamically changed to the other of the two containers. The fresh build material from the containers 114a, 114b, may be consumed, for example, when loading the build unit 102 with build material prior to the build unit 102 being installed in the printer 104 for a 3D printing production run.

A build unit use time, namely a time required for printing of a 3D object before build unit 102 can be reused, may depend upon both a printing time of a 3D object whilst the build unit 102 is in the printer 104 and a cooling time of the contents of the build volume of the build unit 102. It will be understood that the build unit 102 can be removed from the printer 104 after the printing operation, allowing the printer 104 to be re-used for a further printing operation using build material within a different build unit before the total build unit use time has elapsed. The build unit 102 can be moved to the material management station 106 at the end of the printing time. A vacuum system can be used, in some examples, to promote more rapid cooling of the contents of the build volume following a 3D print production process than would otherwise occur without the vacuum system.

The material management station 106 in this example has a recovered build material tank 108 (see FIG. 1B), located internally, where build material recovered from the build unit 102 by the vacuum system is stored for subsequent reuse, if appropriate. Some build materials may be recyclable whilst others may be non-recyclable. In an initial 3D printing production cycle, 100% fresh build material may be used. However, on second and subsequent printing cycles, depending upon build material characteristics and user choice, the build material used for the print job may comprise a proportion of fresh build material (e.g. 20%) and a portion of recycled build material (e.g. 80%). Some users may elect to use mainly or exclusively fresh build material on second and subsequent printing cycles, for example, considering safeguarding a quality of the printed object. The internal recovered build material tank 108 may become full during a post-production clean-up process, although it may become full after two or more post-production clean up processes have been performed, but not before. Accordingly, an overflow tank in the form of an external overflow tank 110 can be provided as part of the material management station 106 to provide additional capacity for recovered build material for use once the internal recovered build material tank 108 is full or close to full capacity. Alternatively, the external overflow tank 110 can be a removable tank. In this example, one or more ports are provided as part of the material management station 106 to allow for output of or reception of build material to and/or from the external overflow tank 110. A sieve 116 or alternative build material refinement device may be provided for use together with the internal recovered build material tank 108 to make non-solidified build material recovered from a 3D printing production process for recycling more granular, that is, to reduce agglomeration (clumping).

The material management station 106 in this example has a mixing tank (or blending tank) 112 comprising a mixing blade (not shown) for mixing recycled build material from the internal recovered build material tank 108 with fresh build material from one of the supply containers 114a, 114b for supply to the build unit 102 when it is loaded prior to a printing production process. The mixing tank (or blending tank) 112, in this example, is provided on top of the material management station 106, above the location of the build platform 122 when the build unit 102 is docked therein. The mixing tank 112 may be connected to a mixer build material trap 113 for input of build material into the mixing tank 112.

The supply containers 114a, 114b, the external overflow tank 110 and the main body of the material management station 106 may be constructed to fit together in a modular way, permitting a number of alternative geometrical configurations for the fully assembled material management station 106. In this way, the material management station 106 is adaptable to fit into different housing spaces in a manufacturing environment.

The supply containers 114a, 114b may be releasably connected to the main body of the material management station 106 via respective supply container connectors 134a, 134b.

Figure 2:
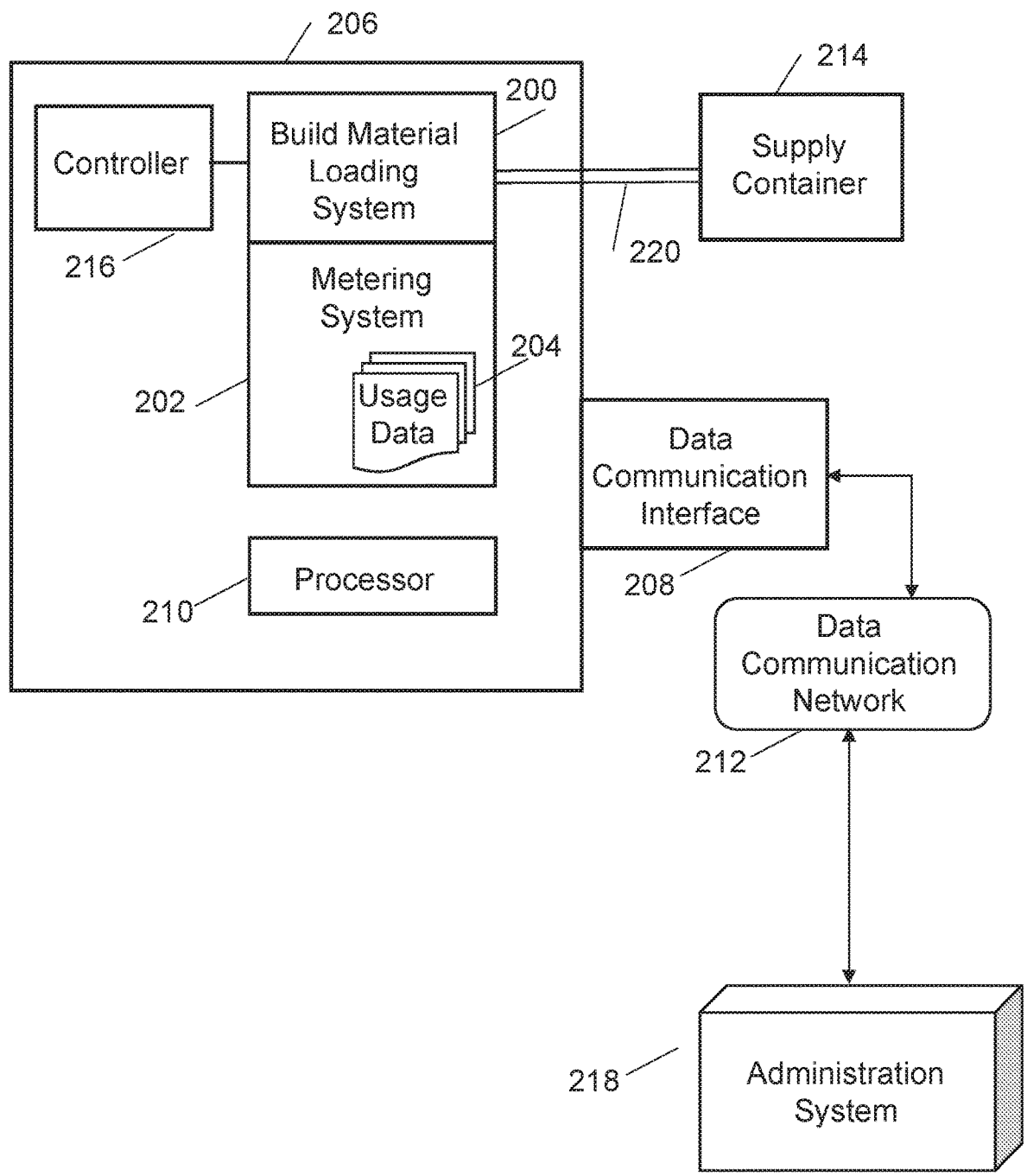
FIG. 2 schematically illustrates the material management station of FIG. 1B connected to a supply container and administration system according to one example.

FIG. 2 schematically illustrates a management station 206 in the form of material management station 106. The material management station 206 can be used in conjunction with the build unit 102 of FIG. 1A.

Material management station 206 in this example includes a build material loading system arranged to receive build material from one or more supply containers 214. In one example the build material loading system 200 of the material management station 206 can include a conduit network and a pump to provide a pressure differential across the network to transport non-solidified build material between different components, such as mixing tanks, waste purging containers, build unit 102, or other components. The pump may be a suction pump which operates to create a pressure differential across the suction pump to produce air flow from an air inlet at substantially atmospheric pressure through the conduit network towards an upstream side of the suction pump (at a pressure below atmospheric pressure or at "negative pressure"). The pump may be provided as an integral part of the material management station 206 in one example, but in another example, the material management station 206 provides a negative/reduced pressure interface, via which a suction pump may be detachably coupled or coupled in a fixed configuration. When the pump is active, a differential pressure can be provided between different parts of the material management station 106 that can enable build material to be transported around the station.

The build material loading system 200 may include a series of valves controlled by a controller 216, for example a programmable logic controller, forming a part of processing circuitry of the build material management station 206. The controller 216 may electronically open one or more valves to open one or more paths in the conduit system based on the material transport operation being performed. The controller 216 may also electronically close one or more valves to close one or more paths in the conduit system. The valves may be, for example, butterfly valves and may be actuated using compressed air. In another example, one or more valves may be opened and closed manually by a user.

FIG. 2 shows one supply container 214 releasably connected to the material management station 106. In other examples a plurality of supply containers can be connected to the material management station 206. In this example the supply container is connected to the material management station with a hose 220 connected to a build material loading system 200. The build material loading system 220 in this example operates via the conduit network described above.

Each supply container 214 has a supply valve (not shown) for isolating the supply container from the environment, which may be opened when the container is connected to the build material loading system 200. Each supply container 214 also includes a piping system (not shown) for transporting build material from the base of the supply container 214 to the supply valve, and an air inlet valve (not shown) to ensure air can enter the supply containers to maintain air pressure within the supply container 214.

To transport build material from the supply container 214 to the material management station, valves separating the supply container 214 and the build material loading system 200 can be opened. When the pump is active a differential pressure can be provided from the build material loading system 200 to the supply container 214. This enables a flow of air and material from the supply container 214 to be transported into the build material loading system 200.

The build material loading system may contain or be connected to a collection tank into which material from the supply container 214 is dispensed as outlined below with reference to FIG. 3A.

The collection tank may include, or be connected to, a metering system 202 for metering the amount of build material that has been transported from the supply container 214 into the material management station 206 using the build material loading system 200. This metering system may comprise a weight sensor as described below with reference to FIG. 3A or other means of metering the amount of material transported. The metering system 202 of the material management station can be configured to produce digital usage data 204, which may comprise, for example weight data, volume data, or data relating to other measurements, indicating a measure of the amount of build material that has been loaded from the supply container into the build material loading system.

In this example the material management station 206 is connected to a data communication interface 208 configured to allow communication via a data communication network 212.

The material management station 206 also contains a processor 210 which, when executing software instructions held in storage (not shown) in the management station, is configured to control the operation of the material management station 206 and has access to various operational data generated and stored in the management station 206, including, for example, usage data 204 generated by the metering system 202. The processor 210 may also be configured to communicate with the supply container 214.

The processor 210 may be configured to communicate with an administration system 218 via the data communication network 212. Administration system 218 is run on a data processing platform located remote from the material management station 206, for example in a control center. Alternatively, or in addition, functions of the administration system may be distributed across data processing platforms in a number of different physical locations or on any other system connected to the data communication network. The processor 210 can be configured to send usage data 204 generated by the metering system 202 to the administration system 218 via the data communication network 212.

The processor 210 may also be configured to receive management data, including control messages intended for the material management station 206, from the administration system 218 via the data communication network 212.

The management station 206 in this example may contain equipment (not shown) capable of providing a human-machine interface, for example a touch-screen display. The touch-screen display can be configured to display some or all of the content of messages received by the processor 210 from the administration system 218. Such messages may relate to the amount of build material that has been consumed from supply container 214, the amount of build material remaining in supply container 214, notifications or alerts relating to the consumption of build material from supply container 214 or any messages pertaining to the data sent from the material management station 206 to administration system 218. The processor 210 may also be configured to locally generate messages in relation to messages received from the administration system 218.

The processor 210 may be configured to constantly or periodically monitor the administration system 218 via the data communication network 212 for data generated by the administration system 218, and to retrieve data relevant to the operation of management station 206. It may include an automated shutdown function which prevents the management station 206 from operating one or more functions relating to loading of build material unless it is connected to data communication network and receiving communication from administration system 218. Administration system 218 may transmit heartbeat messages periodically to the management station 206 in order to prevent shutdown. The shutdown function may be delayed by a predetermined grace period after disconnection from the data communication network 212 and/or the administration system 218 in order to allow for data network maintenance periods and problems.

The data generated by the administration system 218 in this example may contain control messages, that control operations of the material management station. Such control messages may include, for example, instructions intended for implementation by a build material usage controller 216, which may include one or more physical components such as a motor and/or a valve, to enable or disable functions of the material management loading system including blocking transport of build material from the supply container 214 to the material management station 206 by preventing operation of part, or all, of the build material loading system 200. Control messages generated by the administration system 218 may cause the controller 216 to enable or disable functions of the material management loading system 206 indeterminately, or for a predetermined period of time.

The processor 210 may also be configured to perform such control operations on the material management station 206 in the absence of control messages from the administration system. In the example where the control messages generated by the administration system 218 cause the processor to restrict use of or disable functions for a predetermined period of time, following receipt of such a message these functions may be controlled according to the control message for the predetermined time period in the event that no more messages are received due to, for example, loss of communication with the data communication network 212.

Figure 3A:
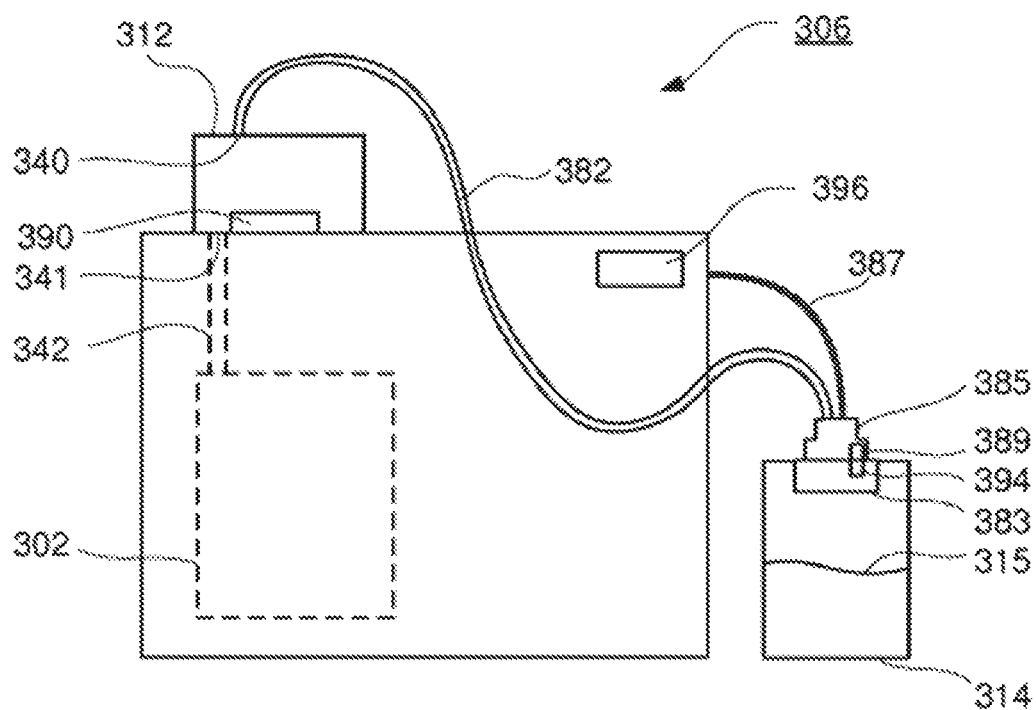
FIG. 3A schematically illustrates a material management station of the example of FIG. 1B connected to a single-use supply container according to an example.

FIG. 3A shows an example of an additive manufacturing material management station 306. The material management station 306 may or may not include any of the features described above in relation to FIG. 2 and may or may not operate in a similar manner to transport particulate build material (e.g. powdered build material) between different components.

In this example, the material management station 306 includes a collection tank 312 for receiving fresh and/or recyclable build material within the main body of the material management station. The collection tank 312 includes an inlet 340 for receiving fresh build material 315 from a supply container 314. The collection tank 312 may also include an outlet 341 for transferring build material out of the collection tank 312 into a container 302. The container 302 may be a build unit as described in relation to FIGS. 1A and 1B. Alternatively, the container 302 may be a separate box or tank for holding build material. An outlet conduit 342 may be connected between the outlet 341 and the container 302, to help transport build material from the collection tank 312 to the container 302.

A supply conduit 382 may connect between the inlet 340 to the collection tank 312 and the supply container 314, The supply conduit 382 may be provided with a tank connector 385 for detachably connecting to the fresh build material tank port 383 of the supply container 314. The supply conduit 382 may detachably connect to the inlet 340 to the collection tank 312, The further end of the conduit 382 (e.g. the tank connector 385) may be disconnected from the supply container 314 so that the supply container 314 can be replaced. For example, when it is empty, an empty supply container 314 may be replaced with a full supply container 314. In another example, the supply container 314 may be replaced with a different supply container 314 containing a different fresh build material 315.

The supply container 314 may be provided with a data memory chip 394, and read-only (one-way electrical communication) or read-write electrical communication (two-way electrical communication) may be established between the management station 306 and the data memory chip of the supply container 314 when the supply container is mechanically connected to the supply conduit 382. The electrical communication between the material management station 306 and data memory chip 394 on the supply container 314 may be encrypted. The data memory chip of the supply container 314 may be a secure memory chip, and the data recorded onto the data memory chip, may be encrypted.

Read-write communication between the material management station 306 and the supply container 314 may alternatively be provided, for example, by providing a two way radio frequency (RF) connection between the material management station 306 and supply container 314. The use of an RF connection may simplify the mechanical connection between the material management station 306 and the fresh build material supply tank 314.

In one example the supply container 314 is a single-use supply container and its memory chip contains data indicating that a type of the container is single-use, an identity of the container to verify its authenticity, and a secure updateable record of contents, indicating a current amount of fresh build material in the container.

In another example the supply container 314 is a bulk-refillable supply container which may include a data memory chip that may store less, and/or less secure, data than that stored on a single-use container memory chip, or may, in some examples, contain no such data memory chip at all. In one example a bulk-refillable supply container memory chip contains data indicating that a type of the container is refillable, an identity of the container, which may be used to verify its authenticity, and no secure updateable record indicating a current amount of fresh build material in the container. It should be noted that, even if no secure updateable record may be included, a less secure record may be included.

In this example the lack of a secure updateable record of contents, as provided in the single-use supply container's memory chip, may be obviated, ameliorated, or improved, by functionality provided in the management station which enables the management station to interact securely with the remote administration system, and which when combined with updates sent to, and remote control commands received from, in administration system. This system provides restrictions in use of bulk-refillable material to an amount of bulk-refillable material authorized in the administration system, as will be described below, but nevertheless allows the management station to use single-use supply containers interchangeably with the bulk-refillable supply containers, or after authorized use of the bulk-refillable supply containers has been restricted or ended.

In the example shown in FIG. 3A, a supply container connector 385 has a chip reader 389 configured to connect electrically to a data memory chip 394 on the supply container 314 by contacting electrode pads (not shown) in the supply container port 383 with resiliently deformable electrodes (not shown) (e.g. sprung-electrodes) in the supply container connector 385. The electrode pads are electrically connected to the data memory chip 394 of the supply container 314. The data communication cable 387 communicates data between the chip reader 389 and a data processor 392 of the material management station 306, which may or may not be the same processor as processor 210.

When the supply container connector 385 of the supply conduit 382 is mechanically coupled to the supply container 314, the material management station 306 may read data that has been permanently stored, or has previously been written onto, the data memory chip 394 of the supply container.

In the example of a single-use container, the previously written data may record a container identifier for the supply container 314, may record the type of fresh build material 315 within the supply container, and may record the initial quantity of fresh build material 315 contained in the supply container prior to first post-manufacturing use and/or the recorded residual quantity of fresh build material 315 remaining within the supply container after prior use. Additionally, the material management station 306 may write data to the data memory chip 394 of the supply container 314. For example, data may be written to the data memory chip 394 to update the record of the recorded residual quantity of fresh build material 315 therein, as (or after) fresh build material is drawn out up the supply conduit 382.

Where applicable, some of the data recorded on the data memory chip 394 may be read-only data (e.g. the type of fresh build material 315), and some of the recorded data may be over-writable by the material management station 306 (e.g. a quantity of fresh build material 315). The data memory chip 394 may be encrypted, to prevent or hinder reading from and/or writing to the data memory chip, except by a compatible material management station 306 (e.g. with communication being established after a hand-shaking protocol has been successfully completed). Additionally, the data memory chip 394 may be protected by a restriction that limits the recorded data corresponding to a residual quantity of fresh build material to counting monotonically, corresponding with a decreasing recorded residual quantity (e.g. a one-way counter).

A data processor 392 of the material management station 306 may read the container identifier recorded on the data memory chip 394 of the supply container 314, and, in the example of a single-use supply container, use the container identifier to identify the type of fresh build material 315 contained in the supply container (e.g. by consulting a look-up table of the data processor). If the type of fresh build material 315 identified by reading the container identifier is incompatible with the 3D printer 104 of the 3D printing system 100, the data processor prevents fresh build material 315 from being drawn into the material management station 306, e.g. preventing the fresh build material from being drawn into the supply conduit 382, e.g. to protect the 3D printer from damage arising through the use of incompatible build material.

If the data processor 392 detects that the recorded residual quantity of fresh build material 315 in the single-use supply container 314 is at or below a threshold level (e.g. zero) the data processor prevents fresh build material 315 from being drawn into the material management station 306 from the supply container. For example, the material management station 306 may fully extract the contents of a supply container 314 and write data (e.g. a status flag) to the data memory chip 394 of a single-use container to indicate that the supply container should no longer be used. Accordingly, in the event that a single-use supply container 314 has been re-filled subsequent to manufacture, the data processor 392 may prevent the withdrawal of further build material, in excess of the initial quantity of fresh build material with which the manufacturer filled the supply container 314 (i.e. prior to first use).

In the example of a bulk-refillable supply container the management station 306 may restrict use of or disable transfer of the build material according control messages received from a remote administration system, as described below. The residual quantity of fresh build material that can be added from a bulk-refillable container to the material management station can be monitored and controlled by the remote administration system.

The withdrawal of fresh build material from a bulk-refillable supply may be prevented by closing one or more valves that connect the supply container to the material management station 316, thereby preventing coupling of the supply container 314 to negative pressure from the pump.

If the administration system detects that the recorded residual quantity of fresh build material 315 in a bulk supply package is at or below a threshold level (e.g. zero), due to refilling of bulk-refillable supply containers, the data processor prevents fresh build material 315 from being drawn into the material management station 306 from the bulk-refillable supply container. For example, the material management station 306 may stop loading build material from the supply container irrespective of its fill state, or partly or fully extract the contents of a supply container 314, and thereafter prevent further loading from any bulk-refillable supply container, whilst loading from a single-use supply container may remain enabled.

If the data processor 392 is unable to read a container identifier from supply container 314, the data processor may prevent fresh build material 315 from being drawn into the material management station 306 from the supply container, which may protect the printer from damage arising through the use of an incompatible supply container.

In the example of a bulk-refillable supply container, data stored on a chip in the container may record the type of container in use to indicate that the contents are bulk-filled material, and not record data describing the type or quantity of material stored within the supply container. A determined residual quantity of bulk-supplied fresh build material allocated to the management station, or a grouped set of management stations, may be recorded locally by the material management station 306 and/or by the administration system, such as the administration system, on which the recorded data is correlated with a unique identifier for the bulk-refillable supply container, and material management station.

The collection tank 312 includes a metering system for measuring a total quantity of build material within the collection tank 312. In the illustrated example, the metering system utilizes a weight sensor 390. The weight sensor 390 may include a load cell placed within the collection tank 312. Alternatively, a weight sensor may be provided that weighs the fresh build material supply tank, e.g. with a weight sensor in a bay of the material management station 306, upon which the supply container sits, in use. In a further alternative, the quantity sensor may be a volume sensor.

Figure 3B:
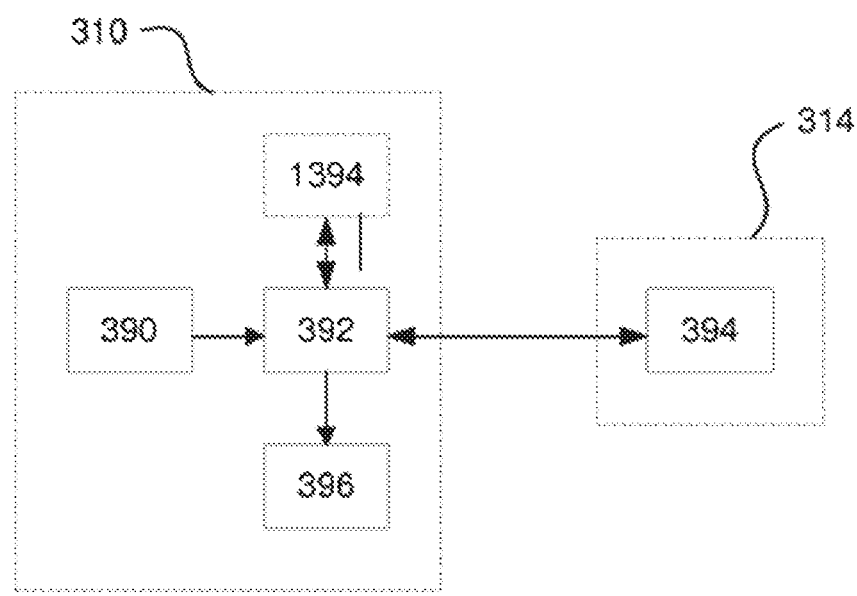
FIG. 3B schematically illustrates a data processing system in the material management station in electrical communication with a single-use container in correspondence with the example of FIG. 3A.

The weight sensor 390 may form part of a data processing system 310, as shown in FIG. 3B. In this example, the data processing system 310 comprises the weight sensor 390, a data processor 392, a supplementary data memory chip 1394 in the material management station 306, and an output display 396. The weight sensor 390 is configured to transmit weight data to a data processor 392, which may be connected to the weight sensor via suitable circuitry, for example. The data processor 392 receives weight data from the weight sensor 390 to allow the data processor 392 to determine the weight of fresh build material 315 drawn out of the supply container 314. By knowing the quantity of fresh build material 315 in in the supply container 314, e.g. by reading the recorded initial quantity or recorded residual quantity of fresh build material 315 in a single-use supply container 314 from the data memory chip 394, this allows the data processor 392 to compute an updated residual value of the weight of fresh build material 315 remaining in the supply container 314. The data processor 392 may then write the updated residual value to the data memory chip 394 of the supply container 314. Further, if the data processor 392 detects that the computed updated residual quantity of fresh build material 315 in the supply container 314 is at or below a threshold level (e.g. zero), the data processor prevents fresh build material 315 from being drawn into the material management station 306 from the single-use supply container.

For example, a portion of fresh build material 315 may be transferred to the collection tank 312 via the conduit 382 from an initially full supply container 314. The weight sensor 390 in the collection container 312 (or alternatively, a weight sensor beneath the supply container 314) may measure the weight of fresh build material 315 withdrawn from the fresh build material supply tank and added to the collection tank. The data processor 392 can receive weight data from the weight sensor 390 corresponding to the weight of fresh build material 315 added to the collection tank 312 and can subtract the weight of fresh build material 315 added to the collection tank 312 from the recorded initial weight of build material 315 within the single-use supply container 314. Thus, the data processor 392 can calculate a remaining weight of fresh build material 315 within the supply container 314, which may then be updated onto the data memory chip 394.

In the example where the container is a bulk-refillable container that does not store build material usage data, the metering system of the collection tank as described above can be configured to provide usage data 204, describing the amount of build material that has been transported into the collection tank, to the processor 210 to be transmitted to a remote administration system, as described below with reference to FIG. 4.

The initial weight of a single-use fresh build material 315 in the supply container 314 can be controlled or measured during manufacture of the supply container 314, Thus, the initial weight of fresh build material 315 in a supply container 314 may be stored on the data memory chip 394 of single-use supply containers prior to the first post-manufacturing use. Alternatively, if the initial weight of fresh build material 315 in the supply container 314 is not already known, the initial weight of build material can be measured, for example using weight sensors (not shown) prior to connecting the supply container 314 to the conduit 382 of the material management station 306.

A supplementary secure data memory chip 1394 may be included in the data processing system 390 and may be integral with the material management station 306. The supplementary data memory chip 1394 can store the weight of fresh build material 315 remaining in the supply container 314 and the weight of build material in the collection tank 312. The data processor 392 can write and/or update the calculated remaining weight of fresh build material 315 within the single-use supply container 314 to the data memory chips 394 and 1394, Alternatively or additionally, the data processor 392 may write and/or update the total weight of fresh build material 315 removed from the single-use supply container 314 to the data memory chips 394 and 1394. The supplementary data memory chip 1394 may record data relating to the supply container 314 and the withdrawal of fresh build material from the build material supply tank. The data recording may occur after the withdrawal of fresh build material 315 has been completed or may occur during the withdrawal of fresh build material, e.g. as a real-time update.

Further portions of fresh build material may be transferred to the collection tank 312 from the supply container 314. Further portions of fresh build material 315 may be added to an empty or substantially empty collection tank 312 or may be added to the collection tank 312 in addition to build material already within the collection tank 312. The data processor 392 can obtain further weight data from the weight sensor 390 corresponding to a weight of a further portion of fresh build material within the collection tank 312 and can process the further weight data to calculate a total weight of fresh build material remaining in the single-use supply container 314.

For example, if the further portion of fresh build material is added to an empty or substantially empty collection tank 312, the weight sensor can measure the total weight of build material within the collection tank. The data processor may receive the weight data from the weight sensor 390 and can use the weight data to calculate a remaining weight of build material 315 within a single-use supply container 314. Alternatively, in the example of a bulk-refillable supply tank the weight data may be transmitted to a remote administration system.

To calculate a residual weight of fresh build material 315 in the single-use supply container 314, that was provided by the tank manufacturer, the data processor may obtain data corresponding to the total weight of fresh build material previously transferred to the collection tank 312 from the data memory chip 394. The data processor 392 may then add the weight of build material previously transferred to the weight of the further portion of build material within the collection tank 312 (as measured by the weight sensor 390), to thereby calculate a total weight of fresh build material that has transferred from the supply container 314 to the collection tank 312. The data processor 392 may then write this updated residual weight data to the data memory chip 394 for use in further calculations.

The data processor 392 may subtract the total weight of fresh build material that has transferred from the single-use supply container 314 from the initial weight of fresh build material 315 in the supply container 314 to thereby calculate a remaining weight of fresh build material 315 in the supply container 314.

In another example, the data processor 392 may obtain data corresponding to the weight of fresh build material 315 remaining in the single-use supply container 314 from the data memory chip 394. This data may have been written to the data memory chip 394 by the data processor 392 after a previous calculation. The data processor 392 may then subtract the weight of the further portion of fresh build material transferred to the collection tank 312 (as measured by the weight sensor 390), and subtract this weight data from the remaining weight of fresh build material 315 previously recorded in the supply container 314, to calculate a new remaining weight of fresh build material 315 in the supply container 314.

The material management station 306 may include, for example, an output display 396, for example an LED screen, which may display the residual weight of fresh build material 315 determined to be in the supply container 314 and/or the total weight of build material within the collection tank 312 and/or the remaining allowance of bulk material that may be supplied through bulk-refillable supply tanks. The output display 396 may form part of the data processing system 310 as shown in FIG. 3B. The data processor 392 may be connected to the output display 396 to transmit weight data to the output display 396.

The supply container 314 may be disconnected and replaced with a different fresh build material supply tank at any time. For example, the supply container 314 may be replaced when the data processor 392 calculates there is no fresh build material 315 remaining in a single-use supply container 314. When the supply container 314 is replaced (e.g. with a full single-use fresh build material supply tank), the data processor may read data from the corresponding data memory chip 394 of the fresh build material supply tank to obtain the quantity of fresh build material 315 recorded to be contained therein (which may differ from the actual quantity of fresh build material contained in the tank, if the tank has been subject to an unauthorized re-fill).

Some material management stations may include two or more supply containers 314 as described above. In this case, the data processor 392 may switch the source of fresh build material to a second fresh build material supply tank when it calculates or otherwise receives data indicating that a first fresh build material supply tank is empty or that an allowance for use has been exhausted. This allows continuous transfer of fresh build material to the mixing tank whilst the first fresh build material supply tank is replaced. The data processor 392 can measure or receive data indicating the remaining weight of fresh build material in the second fresh build material supply tank in the same way as described above.

Figure 4:
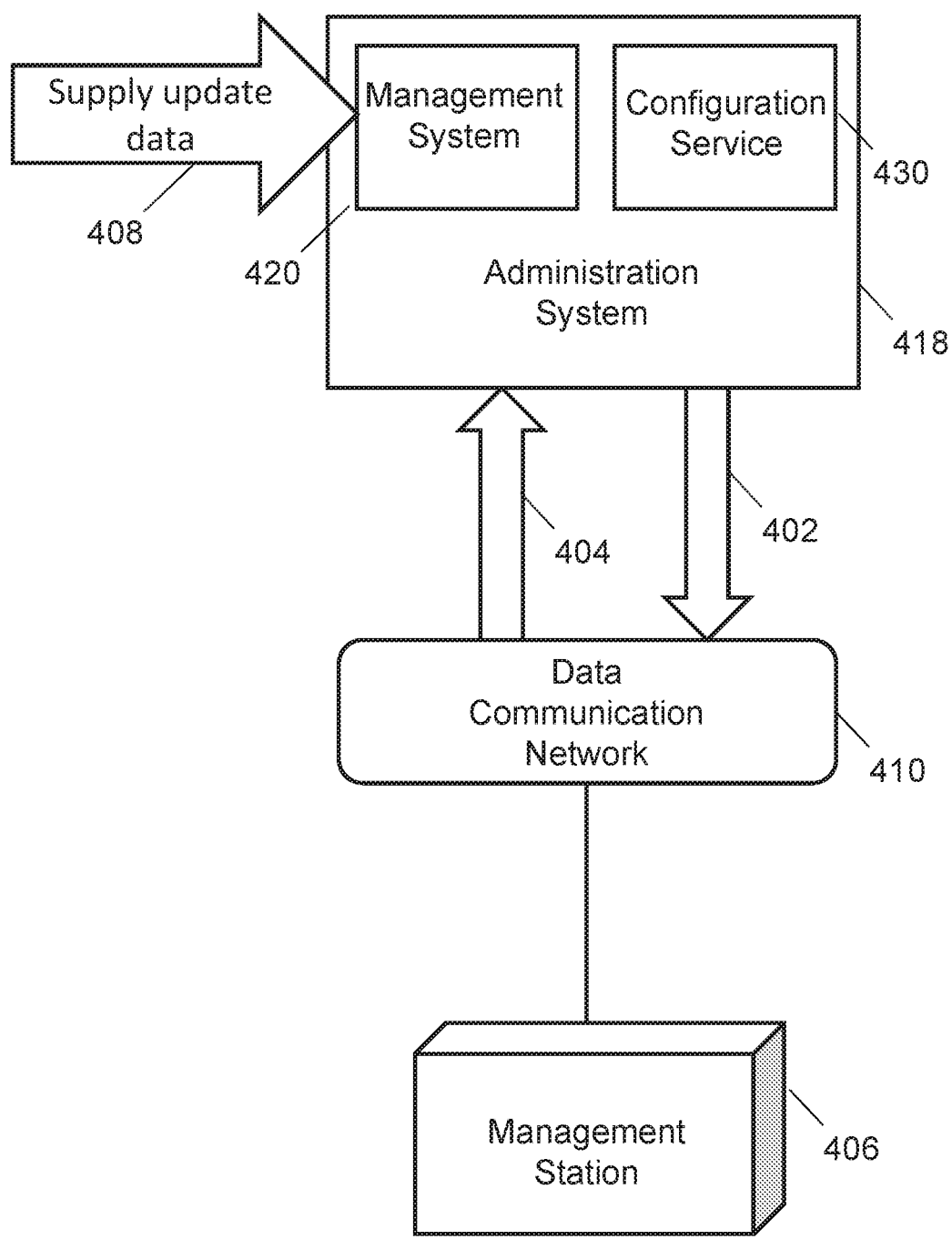
FIG. 4 schematically illustrated an administration system for a material management station according to an example.

FIG. 4 shows an example of an administration system configured for controlling additive manufacturing processes. Such processes may include those described above. The system is suitable for use with a bulk-refillable supply container that does not contain a single-use data memory chip capable of storing data describing the amount of material it contains. The administration system 418 in this example corresponds to administration system 218 of FIG. 2.

In this example the administration system 418 contains a management system 420 capable of recording information relating to the consumption of an allowable usage of a resource, such as bulk supplied build material, and a configuration service 430 capable of generating control messages that can cause a processor to alter operation of material management stations. It is to be understood that the administration system may contain more data processing elements that perform other functions than that shown.

The administration system 418 of FIG. 4 in this example is configured to communicate with a management station 406, corresponding to management station 206 of FIG. 2, which is remote from the administration system, via a data communications network 410.

In one example the management system 420 of the administration system 418 is configured to receive and store supply update data 408 indicative of an initial allocation of usage of bulk-supplied build material to be granted to at least one material management station 406 and associate the granted allocation with a level-of-usage record held the at least one material management station 406. In one example the supply update data describes an allocation of build material that may be received from one or more bulk-refillable supply containers 214, into the material management station 406. The supply update data 408 may also be indicative of an increase, decrease, or other alteration to a level-of-usage already stored by the management system. Amendments may be made to the granted allocation following, for example, purchase of more bulk-supplied build material.

The management system 420 is also configured to receive data 404 from the material management station 406, via a data communication network 410. Such data may contain usage data indicative of the amount of build material loaded from at least one supply container 214 into a material management station 406. The management system can update the level-of-usage record so as to remove the used amount of material described in the usage data 204 from a stored allocation to create a new current level-of-usage record.

A configuration service 430 within the administration system 418 may be configured to communicate with the management system 420 to generate one or more control messages based on the currently stored allocation. Control messages may be configured to enable features such as loading of build material from bulk-refillable supply containers to the material management station in response to the management system current usage allocation indicating an allowable usage amount within an expected range, such as any amount above zero. In addition, the control messages may be configured to disable features such as loading from a bulk-refillable supply container in response to the management system's current allocation indicating an amount of usage outside an expected range.

It is to be understood that where control messages may for example disable the loading of bulk supplied build material, the disabling may also be conducted in response to detection of a period of time since a periodic re-enabling control message is received.

An amount of material previously loaded by the build material loading system may remain usable according to the control message generated by the configuration service. In addition, loading of recycled or recovered material from the recovered build material tank 108 may be enabled whilst loading of fresh build material is disabled.

The control messages generated by the configuration service 430 may contain digital permission grants or permission revocations that cause the processor 210 to enable, or alternatively restrict use of or disable at least one of the operational features of the material management station 406. Such operational features may include the transport of build material from a supply container such as a bulk-refillable supply container, to the material management station 406.

The control messages may contain information that causes the processor 210 to restrict use of or disable operational features of the material management station for an indeterminate period, or may grant a temporal amount of usage of the operational features. In the example where the control messages contain a grant of a temporal amount of usage of the operational features the control of such features extends until the temporal amount of usage expires. In this way the grant of usage cannot be bypassed in the event of a loss of connection between the material management station 406 and the data communication network 410.

In one example, the configuration service 430 can periodically receive information from the management system 420 indicating that a level-of-usage falls within an expected range. The configuration service can then periodically generate a control message granting a temporally-limited permission to receive build material from a bulk-refillable container into the material management station. This control message is periodically communicated to the material management station via a data communication network while the level-of-usage is within an expected range. Upon receipt by the material management station the control message will cause the processor 210 to temporarily enable such features until another control message is received or the temporal period expires.

In another example, the configuration service 430 can receive information from the management system 420 indicating that a material management station has currently recoded level-of-usage that falls out of an expected range. The configuration service can then generate a control message that causes the processor 210 of the material management station to disable usage of the build material loading system 200 receive material from a bulk-refillable supply container into the material management station. The features may remain disabled until a control message is received granting usage, indicating that an additional allocation of supply has been received in the administration system as supply update data.

In the example where a material management station does not have an associated allocation of bulk supply, the configuration service 430 can generate a default control message wherein the default control message disables usage of build material loading system to load material from a bulk-refillable supply container.

Figure 5:
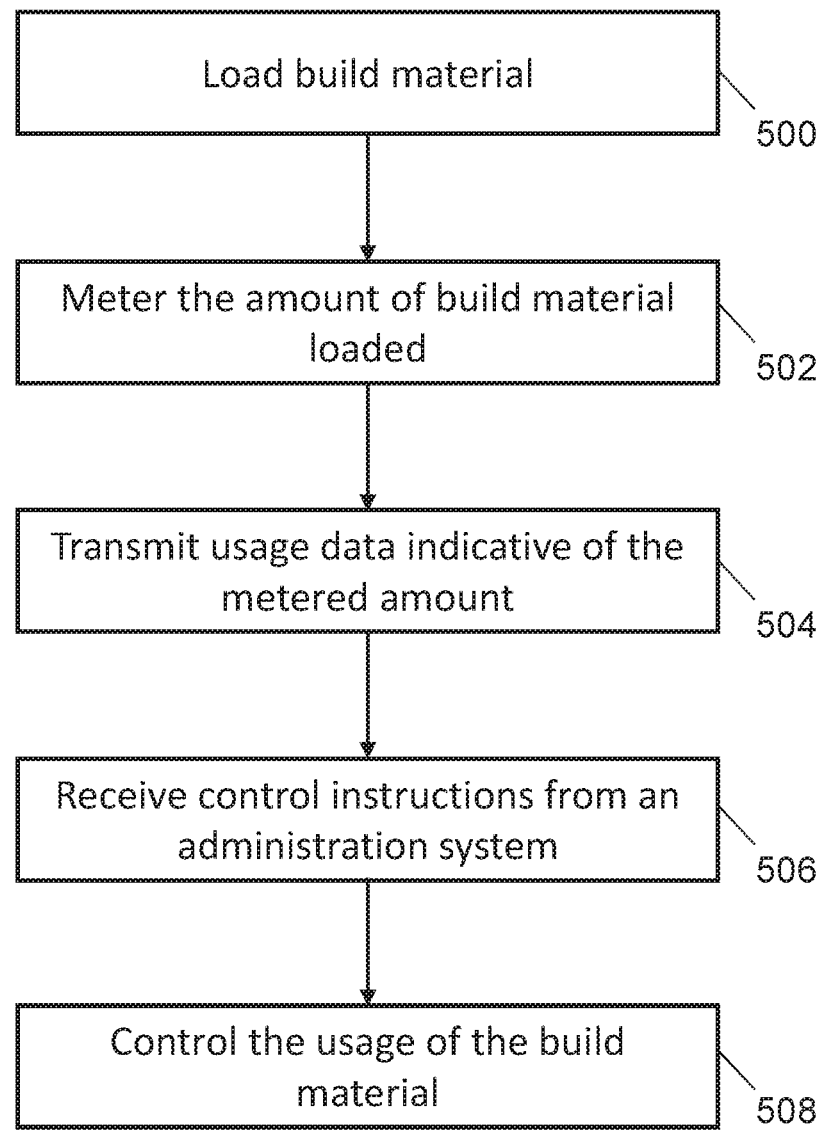
FIG. 5 shows a flow diagram outlining a method of controlling an additive manufacturing process according to an example.

FIG. 5 shows a flow diagram outlining an example of a method of controlling an additive manufacturing process.

The method of FIG. 5 comprises, at block 500, loading build material into material management station from one or more supply containers.

The method further comprises, at block 502, metering the amount of build material that was loaded from the one or more supply containers and generating usage data.

The method further comprises, at block 504, transmitting the usage data indicative of the usage amount, generated at block 502, to an administration system remote from the material management station.

The method further comprises, at block 506, receiving one or more control messages from the administration system.

The method further comprises, at block 508, controlling the usage of build material in the additive manufacturing process in response to the at least one control message.

FIG. 6 shows an example of a non-transitory computer readable storage medium according to an example. The storage medium 600 stores instructions which when executed by a processor 610 cause the processor to perform the actions shown in the blocks of FIG. 6.

At block 602 the processor monitors an amount of build material for use in an additive manufacturing process that is loaded from one or more supply containers by reading build material usage data 604 from a metering system.

At block 606 the processor transmits the usage data indicative of the monitored amount of build material usage to an administration system 618.

At block 612 the processor receives one or more control messages 614 generated by administration system in response usage data transmitted by the processor. The control messages contain processor readable instructions instructing the processor to control features of the additive manufacturing process.

At block 616 the processor controls usage of a build material in the additive manufacturing process in response to the at least one control messages by controlling features of the additive manufacturing process.

An example of the above disclosure will now be described in relation to an additive manufacturing system that provides for the control of the use of bulk-supplied build material. In this example the build material is supplied in bulk quantities and dispensed into bulk-refillable supply containers, similar to bulk-refillable supply container 214, for use with a 3D printing system, similar to printing system 100. The control of bulk-supplied build material is performed by an administration system similar to administration system 418.

In this example, a network-based management system, similar to management system 420, capable of storing information relating to the bulk-supplied build material consumption of a management station, similar to management station 206, stores an level-of-usage record for bulk-supplied build material. The management system forms part of a network-based administration system similar to administration system 418. When bulk-supplied build material is purchased, the management system receives and stores an update to the level-of-usage record in accordance with a new allocation associated with a management station. The update may be performed by supplying data similar to supply update data 408.

A remaining amount of build material that a management station may load is calculated by the management system using the level-of-usage record and usage data from the management station loading the build material, such as usage data 204, provided via a data communication network.

The management system can identify devices that are over loading build material when the level-of-usage record indicates a usage level outside of an expected range, such as below zero, and communicate this to a configuration service capable of generating control messages, similar to configuration service 430, which can prevent further loading of a management station as described below. When the level of usage is outside of an expected range, a notification from the management system is sent to a communication interface associated with the management station consuming bulk-supplied build material, such as data communication interface 208, that can be displayed on a display of the management station. In this way users of the system are notified that a bulk-supplied build material allocation is exhausted and they are to purchase more build material to continue loading bulk-supplied build material. Upon the purchase of more bulk-supplied build material, the management system increases the amount indicated in the level-of-usage record as described above, and the bulk-supplied build material is separately delivered to the facility in which the management station operates.

The configuration service within the administration system may be configured to generate a bulk configuration profile ("BCP") based on the currently stored level-of-usage record and a BCP uniform resource locator (URL). The BCP and URL are communicated to the management station as part of a control message. The BCP includes a control parameter that defines a quantity of time for which a management station is permitted to continue loading bulk-supplied build material. In this example a single control parameter is used to control allowance of build material loading, but it is to be understood that a plurality of parameters could be used which may or may not be temporal. The configuration service may also supply other configuration profiles that control other operations of the 3D printing system. The configuration profile URL is communicated to a data communication interface of the 3D printing system with a data communication network, such as the Internet, either directly or via a network-based storage service. Such communications are similar to the control messages described above.

Usage data indicative of an amount of build material loaded from a bulk-refillable supply container may be transmitted from the management station to the administration system via the data communication network. The management system uses this usage data to update the bulk-supplied build material allocation by subtracting the amount of build material that has been loaded from the previous allocation, and in response the administration system may stop a periodic transmission of BCPs to the management station, may transmit a default BCP containing information indicating that further loading from refillable storage containers should be disabled. Alternatively, the default BCP may contain no information indicating that further loading from refillable storage containers should be enabled.

A control parameter of a BCP controlling the loading of build material may be a temporal allowance, for example an integer value of the number of minutes, that a management station may continue to load build material. A time-stamp and unique device identifier fora management station (for example, a serial number) is also included in the BCP that to allow a management station to identify the most recent BCP that was addressed to it. The unique device identifier, along with an in-built validation process in a management station to ensure that the unique device identifier matches with an internally-stored device identifier, ensures that BCPs cannot be re-used or shared among management stations.

The duration of a temporal allowance may be longer than an average interval between the periodic transmission of updated BCPs to a given management station, in order to provide robustness against network issues.

A control parameter specifying an initial allowance of bulk-supplied build material consumption may be provided by means of a setting securely held within each management station, for example a firmware setting. Such a setting may allow a limited period of build material loading for initial set up and configuration of the management station, after which build material loading will be disabled until a first, or new, BCP is received.

A default BCP may be associated with a management station by the configuration service in the absence of any association with a bulk-supplied build material allocation. A control parameter in the default profile may prevent loading of bulk-supplied build material. The control parameter may for example be a non-positive value of temporal allowance, for example zero. Once a level of usage falls outside an expected range, the configuration service may remove the association of the management station with the bulk allocation and the management station is associated with a default profile. Once an allocation has been associated with a management station, as a first or subsequent instance, the configuration service may stop supplying the default BCP and supply a BCP with a temporal allowance for the management station to consume bulk-supplied build material until the bulk-supplied build material allocation is exhausted.

It is to be understood that the loading of other non-bulk-supplied build material for example from a non-user refillable supply container, may remain enabled while loading from bulk-refillable supply containers is disabled.

The data communication interface of with the management station may be configured to monitor and retrieve from the administration system the configuration profiles generated by the configuration service and forward them to one or more other associated devices, including forwarding the BCP to a printing station, in order to control usage.

The configuration profiles may be retrieved as they are generated or periodically retrieved form a network based storage service. Where the communication interface retrieves the profiles on a periodic basis, the parameter defining the period of retrieval may be provided by the configuration service.

The management station receives and stores the BCP from the communication interface and enables or disables loading from bulk-refillable supply containers according to the control parameter. A BCP may be accepted by the management station if the unique device identifier in the BCP is that of the management station and the time-stamp is more recently generated that the currently stored BCP. If these conditions are not met, the management station may not accept the BCP. Once a BCP is received and accepted the management station may store the control parameter value and re-initialize a countdown timer with the most recently stored value of time units remaining. In this example the value is a quantity of minutes. Thus, build material loading may be enabled for the generated temporal allowance or until a further BCP is received specifying a different temporal allowance.

When a user of a management station attempts to load bulk-supplied build material from a bulk-refillable supply container, the management station checks the countdown timer prior to commencing the loading operation. While a positive value of remaining time units is stored the management station may continue to load the bulk-supplied build material until the countdown timer reaches zero or a default BCP is received, at which point it will stop loading bulk-supplied build material. If the control parameter does not contain a positive value or otherwise indicates the bulk-supply allocation is exhausted, the management station will not load bulk-supplied build material. The management station may report an alert to the communication interface if a user attempts to load bulk build material while build material loading is disabled, which in turn may be communicated to the administration system.

Data describing the amount of build material that has been loaded, or is pending to be uploaded, may be communicated to the administration system by the management station, for use by the management system in determining a remaining allocation of bulk-supplied build material. This may be done directly or through a network-based storage system. These details may be encrypted by the management station or the communication interface for communication over a data communication network.

An 'offline' method of communicating a BCP to the management station may also be used in which the BCP is stored and transported on a digital storage medium, such as a USB drive or CD, via an e-mail, or through other means. This may be applied where it is not possible or desirable to use a data communication network connection.

It is to be understood that while one management station is described in the examples above, a plurality of management stations can be assigned to a single bulk-supplied build material allocation and/or level-of-usage record stored in the management system.

Where in the above examples, control is performed in relation to a refillable supply container, it should be understood that the same, or similar, control techniques may alternatively, or in addition, be applied in relation to non-user refillable supply containers.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples

What is claimed is:

1. A management station for an additive manufacturing process, comprising:
    a build material loading system to receive build material from a refillable supply container, for use in the additive manufacturing process;
    a metering system to meter an amount of build material loaded from the refillable supply container using the loading system;
    a data communication interface to communicate with an administration system that is remote from the management station; and
    a processor to:
        transmit, via the data communication interface, usage data indicative of the amount of the build material metered by the metering system to the administration system;
        receive, via the data communication interface, a first control message from the administration system, the first control message generated by the administration system in response to the amount of the build material exceeding an allocation amount associated with the loading system;
        in response to receipt of the first control message, disable the loading system to prevent further loading of the build material from the refillable supply container;
        in response to receipt of a second control message from the administration system, grant a temporal amount of usage; and
        disable usage when the temporal amount of usage expires.

2. The management station of claim 1, wherein the processor is to:
    enable a first loading mode based on an authorization of a non-user refillable supply container; and
    enable a second loading mode disabling usage of the build material from the refillable supply container.

3. The management station of claim 1, wherein the processor is to disable the loading system in response to a lack of control data from the administration system.

4. The management station of claim 1, wherein the metering system is to meter the amount of the build material loaded from the refillable supply container via a loading conduit into a collection tank in the management station.

5. The management station of claim 4, wherein the metering system is to weigh an amount of build material in the collection tank.

6. The management station of claim 1, wherein the loading system is to load recycled build material from a recycled build material tank, for use in the additive manufacturing process, and wherein a usage of the recycled build material in the additive manufacturing process is controlled separately from a usage of fresh build material from the refillable supply container, such that loading of the recycled build material from the recycled build material tank is enabled while the loading of fresh build material from the refillable supply container is disabled.

7. An administration system for an additive manufacturing process, the administration system comprising:
    memory;
    instructions; and
    a processor to execute the instructions to:
        receive management data from a build material loading system indicative of an amount of build material loaded from a refillable supply container, the build material loading system remote from the administration system;
        receive first update data indicative of an initial amount of usage granted, and monitor the management data with respect to the initial amount of usage granted;
        receive second update data indicative of an additional amount of usage granted, and monitor the management data with respect to the initial amount of usage granted and the additional amount of usage granted;
        determine whether the amount of the build material is within an expected range of usage;
        cause transmission of a first control message to the build material loading system to prevent further loading of the build material from the refillable supply container when the amount of the build material is outside the expected range of usage; and
        cause transmission of a second control message to enable further loading of the build material when the amount of the build material is inside the expected range of usage.

8. A method of controlling an additive manufacturing process, the method comprising:
    loading, via a build material loading system, build material from a supply container, for use in the additive manufacturing process;
    metering an amount of the build material loaded from the supply container;
    transmitting usage data to an administration system that is remote from the build material loading system, the usage data indicative of the amount of the build material;
    receiving a first control message from the administration system, the first control message generated by the administration system in response to the amount of the build material exceeding an allocation amount associated with the build material loading system;

disabling the build material loading system to prevent further loading of the build material from the supply container in response to the first control message;

granting a temporal amount of usage in response to receipt of a second control message from the administration system; and disabling usage when the temporal amount of usage expires.

9. The management station of claim 1, wherein the processor is to:

receive, via the data communication interface, periodic messages at an interval of time from the administration system; and in response to receipt of one of the periodic messages, enable the loading system to receive more of the build material for a period of time.

10. The management station of claim 9, wherein the processor is to, in response to not receiving one of the periodic messages at the interval of time, disable the loading system.

11. The management station of claim 1, wherein the processor is to disable the loading system by causing closure of a valve in a conduit that couples the refillable supply container to the loading system.

12. The method of claim 8, further including:

receiving periodic messages at an interval of time from the administration system; and in response to receipt of one of the heartbeat messages, enabling the build material loading system to load more of the build material from the supply container for a period of time.

13. The method of claim 8, further including determining, based on information stored in a memory chip on the supply container, whether the supply container is a single-use supply container or a bulk-refillable supply container.

14. The method of claim 8, wherein the build material loading system loads the build material from the supply container to a build unit, the build unit to be docked with a three-dimensional (3D) printer during the additive manufacturing process.

15. The method of claim 8, wherein disabling the build material loading system includes closing a valve in a conduit that couples the supply container to the build material loading system.

* * * * *